(12) United States Patent
Villarroel et al.

(10) Patent No.: US 9,837,707 B2
(45) Date of Patent: Dec. 5, 2017

(54) WINDOW ASSEMBLY HAVING AN ANTENNA ELEMENT OVERLAPPING A TRANSPARENT LAYER AND AN ADJACENT OUTER REGION

(75) Inventors: Wladimiro Villarroel, Lewis Center, OH (US); Ming Lee, Ypsilanti, MI (US); Yasutaka Horiki, Ypsilanti, MI (US)

(73) Assignees: AGC AUTOMOTIVE AMERICAS R&D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 420 days.

(21) Appl. No.: 13/992,603

(22) PCT Filed: Dec. 9, 2011

(86) PCT No.: PCT/US2011/064193
§ 371 (c)(1),
(2), (4) Date: Sep. 17, 2013

(87) PCT Pub. No.: WO2012/079002
PCT Pub. Date: Jun. 14, 2012

(65) Prior Publication Data
US 2014/0015716 A1    Jan. 16, 2014

Related U.S. Application Data

(60) Provisional application No. 61/421,376, filed on Dec. 9, 2010, provisional application No. 61/421,381, filed (Continued)

(51) Int. Cl.
*H01Q 1/32*     (2006.01)
*H01Q 1/12*     (2006.01)
*H01Q 9/42*     (2006.01)

(52) U.S. Cl.
CPC .......... *H01Q 1/325* (2013.01); *H01Q 1/1271* (2013.01); *H01Q 9/42* (2013.01)

(58) Field of Classification Search
CPC .......... H01Q 1/325; H01Q 13/10; H01Q 9/40; H01Q 9/42; H01Q 1/1271
See application file for complete search history.

(56) References Cited

U.S. PATENT DOCUMENTS 3,655,545 A    4/1972 Gillery et al.
4,086,595 A    4/1978 Cherenko et al.
(Continued)

FOREIGN PATENT DOCUMENTS

CN    1402379 A    3/2003
CN    101091286 A    12/2007
(Continued)

OTHER PUBLICATIONS

English language abstract and machine-assisted English translation for CN 101895008 extracted from espacenet.com database on Dec. 29, 2014, 18 pages.
(Continued)

*Primary Examiner* — Graham Smith
*Assistant Examiner* — Noel Maldonado
(74) *Attorney, Agent, or Firm* — Howard & Howard Attorneys PLLC (57) ABSTRACT

A window assembly for a vehicle has a transparent layer including a metal compound such that the transparent layer is electrically conductive. The transparent layer defines an area covering the window assembly. An outer region which is electrically non-conductive surrounds the area. The window assembly includes an antenna element including wire or transparent coating which overlaps the transparent layer and overlaps the outer region. The antenna element is configured to receive linearly or circularly polarized radio frequency
(Continued)

(RF) signals. A feeding element is coupled to the antenna element for energizing the antenna element. The antenna element is capacitively coupled to the transparent layer. The transparent layer operates as a parasitic or active antenna element with respect to the antenna element.

21 Claims, 8 Drawing Sheets

Related U.S. Application Data on Dec. 9, 2010, provisional application No. 61/421,374, filed on Dec. 9, 2010, provisional application No. 61/421,386, filed on Dec. 9, 2010, provisional application No. 61/427,450, filed on Dec. 27, 2010.

(56) References Cited

U.S. PATENT DOCUMENTS

| | | |
|---|---|---|
| 4,768,037 A | 8/1988 | Inaba et al. |
| 4,791,426 A | 12/1988 | Lindenmeier et al. |
| 4,849,766 A | 7/1989 | Inaba et al. |
| 4,864,316 A | 9/1989 | Kaoru et al. |
| 5,005,020 A | 4/1991 | Ogawa et al. |
| 5,017,933 A | 5/1991 | Sakurai et al. |
| 5,132,161 A | 7/1992 | Shibata et al. |
| 5,336,565 A | 8/1994 | Muromachi et al. |
| 5,355,144 A * | 10/1994 | Walton et al. ............... 343/713 |
| 5,528,314 A | 6/1996 | Nagy et al. |
| 5,589,839 A | 12/1996 | Lindenmeier et al. |
| 5,648,785 A | 7/1997 | Nagy et al. |
| 5,670,966 A | 9/1997 | Dishart et al. |
| 5,739,794 A | 4/1998 | Nagy et al. |
| 5,748,155 A | 5/1998 | Kadunce et al. |
| 5,898,407 A | 4/1999 | Paulus et al. |
| 5,926,141 A | 7/1999 | Lindenmeier et al. |
| 5,999,134 A | 12/1999 | Dishart et al. |
| 6,020,855 A | 2/2000 | Nagy et al. |
| 6,097,345 A | 8/2000 | Walton |
| 6,320,276 B1 | 11/2001 | Sauer |
| 6,384,790 B2 | 5/2002 | Dishart et al. |
| 6,400,334 B1 | 6/2002 | Lindenmeier et al. |
| 6,448,935 B2 | 9/2002 | Fuchs et al. |
| 6,552,690 B2 | 4/2003 | Veerasamy |
| 6,670,927 B2 | 12/2003 | Ro |
| 7,119,751 B2 * | 10/2006 | Li et al. ............... 343/713 |
| 7,388,548 B2 | 6/2008 | Maeuser |
| 7,425,926 B2 | 9/2008 | Funatsu |
| 7,456,796 B2 | 11/2008 | Nagayama et al. |
| 7,764,239 B2 | 7/2010 | Baranski |
| 7,847,745 B2 | 12/2010 | Martin |
| 7,880,120 B2 | 2/2011 | Schmidt et al. |
| 7,903,042 B2 | 3/2011 | Urban et al. |
| 2003/0150848 A1 | 8/2003 | Noguchi et al. |
| 2005/0212709 A1 | 9/2005 | Doi et al. |
| 2007/0187382 A1 | 8/2007 | Mauser |
| 2010/0220019 A1 | 9/2010 | Boote |
| 2010/0266832 A1 | 10/2010 | Derda |
| 2011/0050517 A1 | 3/2011 | Delannoy et al. |
| 2011/0062139 A1 | 3/2011 | Schmidt et al. |

FOREIGN PATENT DOCUMENTS

| | | |
|---|---|---|
| CN | 101895008 A | 11/2010 |
| EP | 0297813 A3 | 1/1989 |
| EP | 0 561 272 A1 | 9/1993 |
| EP | 0720249 B1 | 7/1996 |
| EP | 0961342 B1 | 12/1999 |
| JP | 2003-017919 A | 1/2003 |

OTHER PUBLICATIONS

English language abstract and machine-assisted English translation for JP 2003-017919 extracted from the PAJ database on Dec. 29, 2014, 23 pages.

International Search Report for Application No. PCT/US2011/064239 dated Mar. 6, 2012, 7 pages.

English language abstract not found for CN 1402379; however, see English language equivalent U.S. Pat. No. 6,670,927. Original document extracted from espacenet.com database on Sep. 8, 2014, 6 pages.

English language abstract for CN 101091286 extracted from espacenet.com database on Sep. 17, 2014, 2 pages.

* cited by examiner

WINDOW ASSEMBLY HAVING AN ANTENNA ELEMENT OVERLAPPING A TRANSPARENT LAYER AND AN ADJACENT OUTER REGION

RELATED APPLICATIONS

This application is the National Stage of International Patent Application No. PCT/US2011/064193, filed on Dec. 9, 2011, which claims priority to U.S. Provisional Patent Application Nos. 61/421,374, 61/421,386, 61/421,376, and 61/421,381 each filed on Dec. 9, 2010, and U.S. Provisional Patent Application No. 61/427,450 filed on Dec. 27, 2010, each of which is hereby incorporated by reference.

BACKGROUND OF THE INVENTION

1. Field of the Invention

The subject invention generally relates to a window assembly for a vehicle. More specifically, the subject invention relates to a window assembly having a transparent layer and an antenna element overlapping the transparent layer and overlapping an outer region adjacent the transparent layer.

2. Description of the Related Art

Recently, there is an increasing demand in vehicle windshields having clear films or coatings embedded within the windshield for various purposes. Such clear films or coatings often have metal compounds, such as metal oxides, for making the clear films or coatings electrically conductive. These clear films or coatings have been utilized in defogging or defrosting systems and even as active antenna elements for vehicles. More recently, the clear films or coatings have been applied to windshields to absorb heat from sunlight penetrating the windshield. In particular, the clear films or coatings absorb infrared radiation from sunlight. In so doing, the clear films or coatings reduce the amount of infrared radiation entering an interior of the vehicle. The clear films or coatings enable a lower interior temperature as compared to a vehicle having a windshield with no clear films or coatings. As a result, during the warm months, less energy is required to lower the interior temperature of the vehicle. To maximize efficiency of the clear films or coatings to absorb infrared radiation, the clear films or coatings are often applied over a substantial part of the windshield, often covering the entire field of view of the driver.

Traditionally, antennas have been employed on vehicle windshields for a variety of applications. The antennas are often placed upon various locations of the windshield and are energized by a feeder line which is coupled to the antenna. Frequently, it is necessary for the antennas to be disposed within or on an outer surface of the windshield of the vehicle. For the antenna to effectively receive or transmit radio waves without interruption, it is also necessary to reduce surrounding electromagnetic interference with the antenna to the extent possible.

Although the clear films or coatings effectively reduce transmission of infrared radiation through the windshield, the clear films or coatings may also negatively impact the ability of the antenna to transmit or receive radio waves. Specifically, as mentioned above, the clear films or coatings are electrically conductive and therefore naturally have the potential to adversely interfere with the radiation pattern and gain of the antenna on the windshield. Furthermore, where the clear films or coatings are applied over a substantial part of the windshield, there remains minimal space on the windshield to place the antenna such that the clear films or coatings do not adversely affect the functionality of the antenna.

In addition, there is a need to control radiation patterns and impedance characteristics of antennas employed on vehicles. Specifically, antennas utilized by the vehicle are being subjected to ever-increasing electromagnetic interference. As such, controlling radiation patterns and impedance characteristics antennas employed by the vehicle has become increasingly important in order to ensure optimal efficiency of the antennas in transmitting or receiving signals.

SUMMARY OF THE INVENTION AND ADVANTAGES

The invention provides a window assembly for a vehicle. The window assembly includes an exterior substrate and an interior substrate. The exterior substrate has an inner surface and an outer surface. The interior substrate is disposed adjacent the exterior substrate and has an inner surface and an outer surface. The exterior and interior substrates define a first peripheral boundary. A transparent layer is disposed between the inner surfaces of the exterior and interior substrates. The transparent layer defines an area covering the window assembly. The area defines a second peripheral boundary. The transparent layer includes a metal compound such that the transparent layer is electrically conductive. An outer region which is electrically non-conductive is defined on the window assembly between the first and second peripheral boundaries. The window assembly further includes an antenna element. A feeding element is coupled to the antenna element for energizing the antenna element. The antenna element overlaps the transparent layer and overlaps the outer region.

Accordingly, the window assembly provides the outer region for placement of the antenna element in the outer region. As such, the antenna element may be included with the window assembly in instances where there would otherwise be minimal or no space available on the window assembly for the antenna element to function properly without being subjected to interference by the transparent layer completely overlapping the antenna element. Simultaneously, the area of the transparent layer is maximized for operation of the transparent layer in useful applications such as a radiation element, a defogging or a defrosting element, or an infrared radiation absorbing element.

Furthermore, the antenna element overlaps the transparent layer such that the transparent layer is utilized to the advantage of the antenna element. Specifically, overlapping between the antenna element and the transparent layer allows flexibility to modify impedance characteristics of the antenna element. As such, impedance matching of the antenna element improves radiation efficiency of the antenna element. Additionally, overlapping between the antenna element and the transparent layer allows potential miniaturization of the antenna element.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
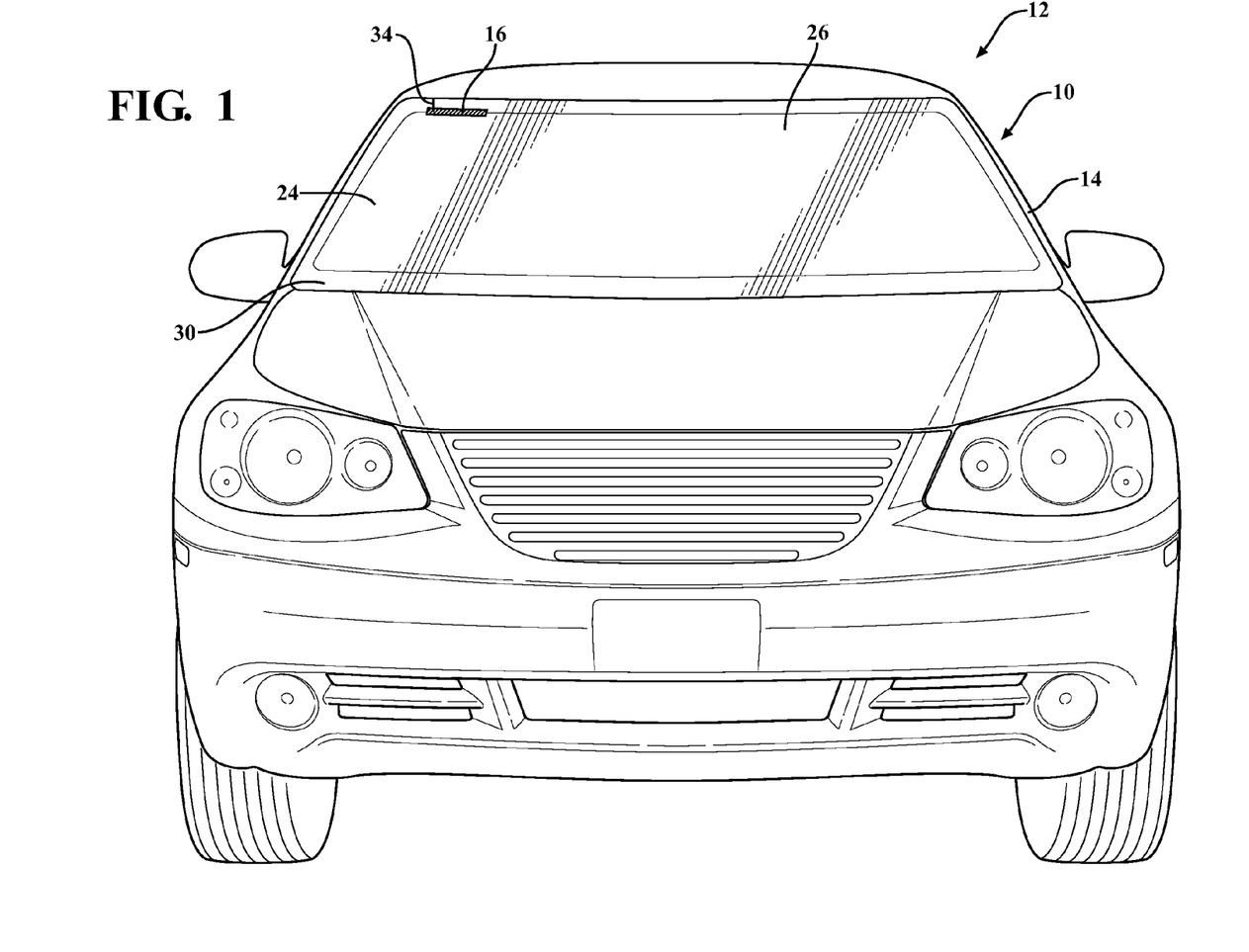
FIG. 1 is a perspective view of a vehicle having a window assembly with a transparent layer and an outer region adjacent the transparent layer with an antenna element overlapping the transparent layer and overlapping the outer region.

Referring to the Figures, wherein like numerals indicate corresponding parts throughout the several views, a window assembly is shown generally at 10 in FIG. 1. Most preferably, the window assembly 10 is for a vehicle 12. The window assembly 10 may be a front window (windshield) as illustrated in FIG. 1. Alternatively, the window assembly 10 may be a rear window (backlite), a roof window (sunroof), or any other window of the vehicle 12. Typically, the vehicle 12 defines an aperture and the window assembly 10 closes the aperture. The aperture is conventionally defined by a window frame 14 of the vehicle 12 which is typically electrically conductive. The window assembly 10 of this invention may be for applications other than for vehicles 12. Specifically, the window assembly 10 may be for architectural applications such as homes, buildings, and the like.

An antenna element 16 is included with the window assembly 10. In a preferred embodiment, the antenna element 16 is configured to receive linearly polarized radio frequency (RF) signals. Specifically, the linearly polarized RF signals which the antenna element 16 may receive include, but are not limited to, AM, FM, RKE, DAB, DRSC, WiMAX, DTV, and cell phone signals. The antenna element 16 may also be configured to transmit linearly polarized RF signals. Most preferably, the antenna element 16 is configured for transmission and/or reception of FM frequencies typically in the range from 88 MHz to 108 MHz. Furthermore, the antenna element 16 may be configured to transmit or receive circularly polarized RF signals such as GPS signal, Satellite Digital Audio Radio Service (SDARS) signals, and the like. The antenna element 16 may also be configured to transmit and/or receive both linearly and circularly polarized RF signals independently or concurrently. The window assembly 10 may also include a plurality of antenna elements 16.

Figure 2A:
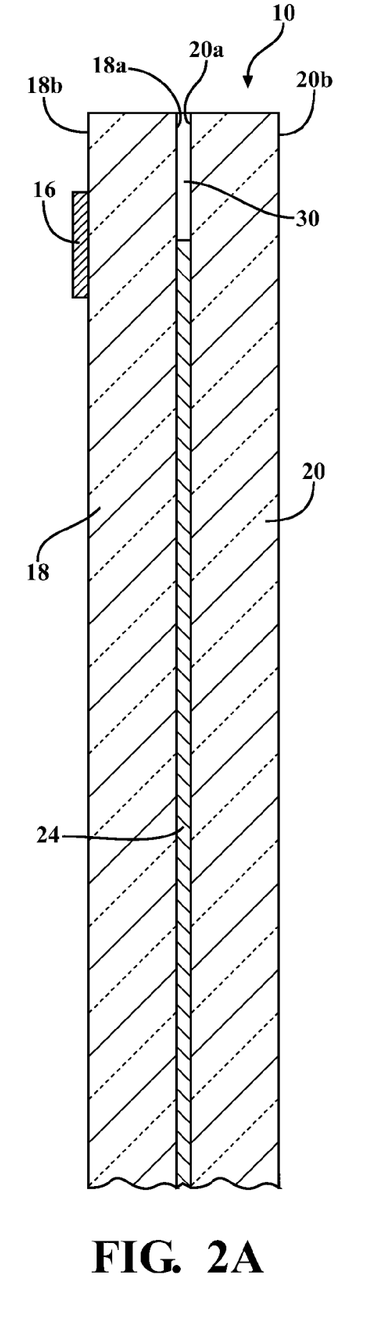
FIG. 2a is a cross-sectional partial view of the window assembly having the transparent layer sandwiched between an exterior and interior substrate and the antenna element overlapping the transparent layer and overlapping the outer region while disposed on an outer surface of the exterior substrate.
Figure 2B:
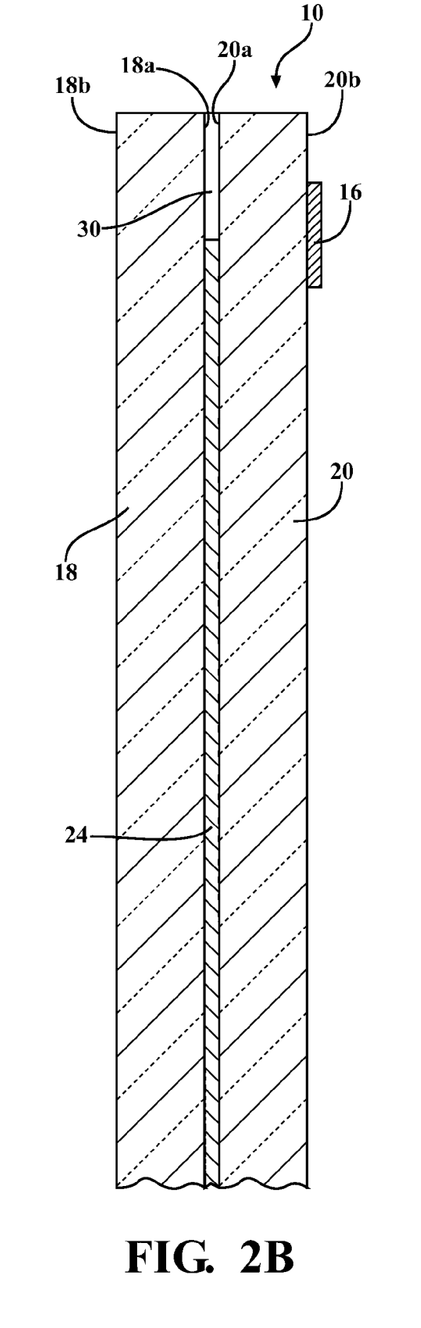
FIG. 2b is a cross-sectional partial view of the window assembly having the transparent layer sandwiched between an exterior and interior substrate and the antenna element overlapping the transparent layer and overlapping the outer region while disposed on an outer surface of the interior substrate.

As illustrated in FIGS. 2a and 2b, the window assembly 10 includes an exterior substrate 18 and an interior substrate 20 disposed adjacent the exterior substrate 18. In one embodiment, the interior substrate 20 is disposed parallel to and spaced from the exterior substrate 18 such that the substrates 18, 20 are not contacting one another. However, it is to be appreciated that the exterior substrate 18 may directly abut the interior substrate 20. Typically, the exterior and interior substrates 18, 20 are electrically non-conductive. As mentioned herein, the term "non-conductive" refers generally to a material, such as an insulator or dielectric, that when placed between conductors at different electric potentials, permits a negligible current to flow through the material. The exterior and interior substrates 18, 20 are also substantially transparent to light. However, it is to be appreciated that the exterior and interior substrates 18, 20 may be colored or tinted and still be substantially transparent to light. As used herein, the term "substantially transparent" is defined generally as having a visible light transmittance of greater than 60 percent.

The exterior and interior substrates 18, 20 are preferably joined together to form the window assembly 10. It is preferred that the exterior and interior substrates 18, 20 are panes of glass. The panes of glass are preferably automotive glass and, more preferably, soda-lime-silica glass. However, the exterior and interior substrates 18, 20 may be plastic, fiberglass, or other suitable electrically non-conductive and substantially transparent material. For automotive applications, the exterior and interior substrates 18, 20 are each typically 3.2 mm thick.

Each of the exterior and interior substrates 18, 20 has an inner surface 18a, 20a and an outer surface 18b, 20b. The outer surface 18b of the exterior substrate 18 typically faces an exterior of the vehicle 12. The outer surface 20b of the interior substrate 20 typically faces an interior of the vehicle 12. The inner surfaces 18a, 20a of the exterior and interior substrates 18, 20 typically face one another when the exterior and interior substrates 18, 20 are joined together to form the window assembly 10.

Figure 3:
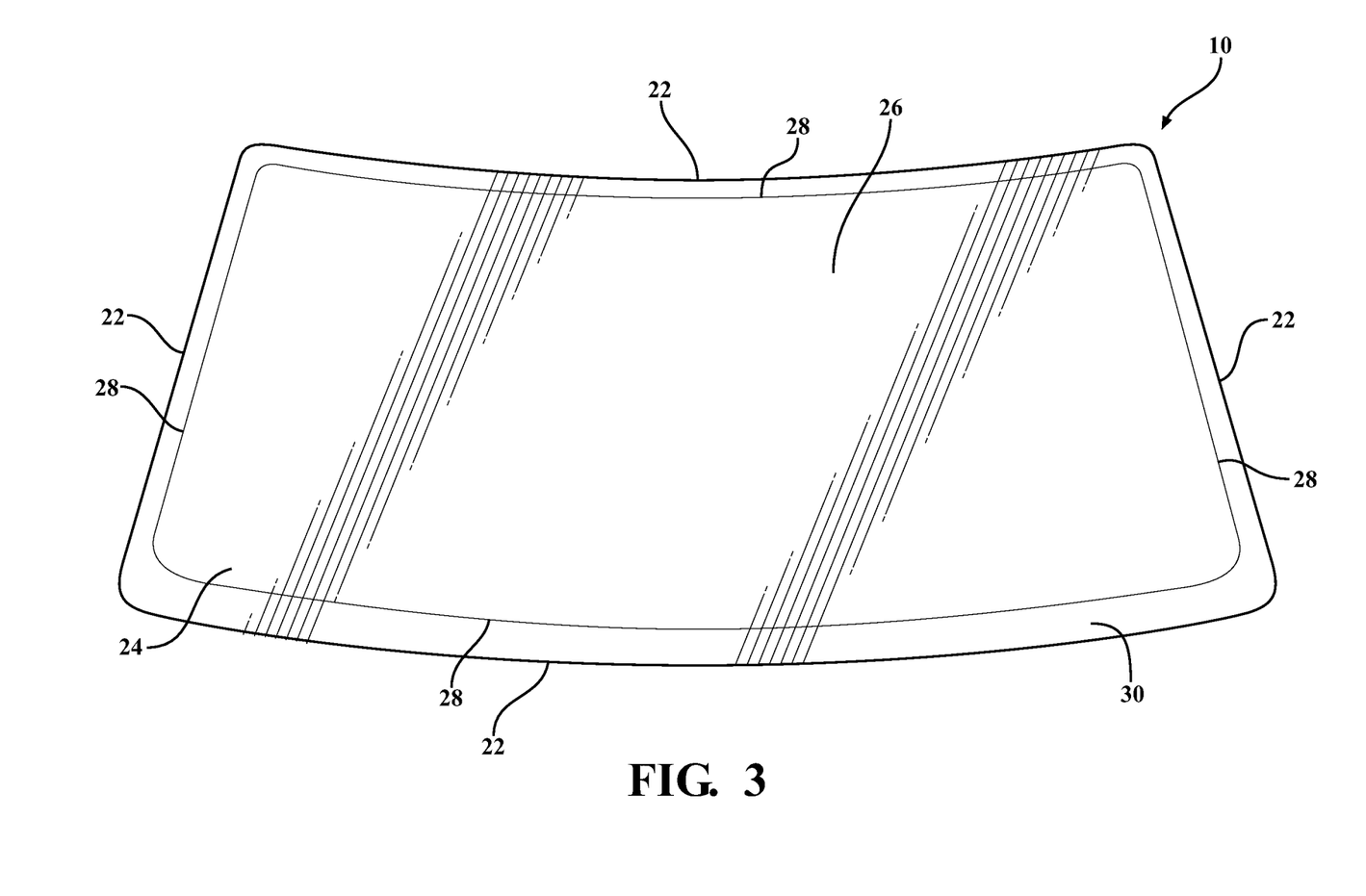
FIG. 3 is a plan view of the window assembly having the outer region adjacent the area of the transparent layer with the transparent layer covering a majority of the window assembly.

As shown in FIG. 3, the exterior and interior substrates 18, 20 define a first peripheral boundary 22. The first peripheral boundary 22 is preferably defined by a peripheral edge of the window assembly 10. Conventionally, the peripheral edge of the window assembly 10 is shared by the exterior and interior substrates 18, 20. Specifically, the exterior and interior substrates 18, 20 have substantially similar areas and shapes with each substrate 18, 20 having an edge forming part of the peripheral edge when the substrates 18, 20 are joined. It is to be appreciated that the edges of exterior and interior substrates 18, 20 need not align to define the first peripheral boundary 22. In other words, the edge of the exterior or interior substrate 18, 20 may extend beyond the edge of the other, respectively. In such instances, the first peripheral boundary 22 may be defined by either or both edges of the substrates 18, 20. Conventionally, the first peripheral boundary 22 has a generally trapezoidal configuration. However, the first peripheral boundary 22 may have any suitable shape.

Referring back to FIGS. 2a and 2b, a transparent layer 24 is disposed between the exterior and interior substrates 18, 20. The window assembly 10 preferably includes the transparent layer 24 sandwiched between the exterior and interior substrates 18, 20 such that the transparent layer 24 is abutting the substrates 18, 20. More specifically, the transparent layer 24 is preferably disposed on the inner surfaces 18a, 20a of the exterior and/or interior substrates 18, 20. Disposal of the transparent layer 24 between the exterior and interior substrates 18, 20 protects the transparent layer 24 from direct contact with environmental factors which may damage the transparent layer 24 such as snow, ice, and the like.

The transparent layer 24 is preferably formed from a coating. Typically, the transparent layer 24 is substantially transparent to light. Accordingly, a driver or occupant of the vehicle 12 may see through the window assembly 10 having the transparent layer 24. With the transparent layer 24 disposed within the window assembly 10, the window assembly 10 exhibits generally greater than 60 percent visible light transmission through the window assembly 10. The transparent layer 24 preferably absorbs heat from sunlight penetrating the window assembly 10. In particular, the transparent layer 24 reduces transmission of infrared radiation through the window assembly 10. As used herein, the term "transparent layer" may include one or more coatings and/or films of selected composition. The coatings and/or films forming the transparent layer 24 may be single or multiple layers. The transparent layer 24 may be disposed in the window assembly 10 according to any suitable method, such as chemical vapor deposition, magnetron sputter vapor deposition, spray pyrolysis, and the like.

The transparent layer 24 includes a metal compound such that the transparent layer 24 is electrically conductive. As mentioned herein, the term "electrically conductive" refers generally to a material, such as a conductor, exhibiting low electrical resistivity for effectively allowing flow of electric current through the material. Preferably, the metal compound includes a metal oxide. However, the metal compound may also include a metal nitride, and the like. The metal oxide may include a tin oxide, such as indium tin oxide, or the like. However, the transparent layer 24 may include other metal oxides, including, but not limited to, silver oxide. The metal compound may also be doped with an additive, such as fluorine. Specifically, the additive may be included in the metal compound to optimize the light transmittance and electrical resistivity of the transparent layer 24. The transparent layer 24 preferably has a sheet resistance in a range between 0.5-20 Ω/square. More preferably, the transparent layer 24 has a sheet resistance of approximately 2 Ω/square. The sheet resistance may also be known as a surface resistance of the transparent layer 24.

The transparent layer 24 defines an area 26 covering the window assembly 10. As shown in FIG. 3, the area 26 may cover a majority of the window assembly 10. Specifically, the majority of the window assembly 10 is defined generally as greater than 50 percent of the window assembly 10. More typically, the majority is greater than 75 percent of the window assembly 10. The transparent layer 24 may cover the majority of the window assembly 10 for maximizing the reduction of transmission of infrared radiation through the window assembly 10. However, it is to be appreciated that the area 26 of the transparent layer 24 may cover a minority of the window assembly 10. For example, the area 26 may cover 20 percent of the window assembly 10 along the upper portion of the window assembly 10. The area 26 may define a shape substantially similar to the first peripheral boundary 22. However, the area 26 may have any suitable shape for covering the window assembly 10. The area 26 of the transparent layer 24 defines a second peripheral boundary 28. The second peripheral boundary 28 is defined preferably by a boundary or perimeter of the area 26.

An outer region 30 is defined on the window assembly 10 between the first and second peripheral boundaries 22, 28. The outer region 30 is preferably adjacent to and surrounding the area 26 of the transparent layer 24. However, the outer region 30 may be defined on predetermined sections of the window assembly 10 such that the outer region 30 is not surrounding the transparent layer 24 continuously along the second peripheral boundary 28. The outer region 30 is devoid of the transparent layer 24 and is therefore, electrically non-conductive. The outer region 30 has a width defined generally as a distance between the first and second peripheral boundaries 22, 28. Preferably, the width is greater than 0 mm and less than 200 mm. The width of the outer region 30 may vary depending upon how the window assembly 10 of the present invention is fitted to the window frame 14 of the vehicle 12. Specifically, the outer region 30 may have the width equal to an overlap between the window frame 14 and the window assembly 10. However, the outer region 30 may separate the transparent layer 24 from the window frame 14 of the vehicle 12 to avoid the possibility of an electrical path between the transparent layer 24 and the window frame 14 which may adversely affect the efficiency and radiation pattern of the antenna element 16. Furthermore, the outer region 30 may protect the transparent layer 24 by separating the transparent layer 24 from the first peripheral boundary 22 which is subjected to environmental factors which may degrade the quality of the transparent layer 24.

The outer region 30 may be formed on the window assembly 10 according to any suitable technique known in the art. For instance, the inner surfaces 18a, 20a of one of the exterior and interior substrates 18, 20 may be masked before application of the transparent layer 24 to provide a desired shape of the outer region 30. Alternatively, the transparent layer 24 may first be applied to the window assembly 10. Thereafter, selected portions of the transparent layer 24 may be removed or deleted to provide the desired shape of the outer region 30. Removal or deletion of selected portions of the transparent layer 24 may be accomplished using lasers, abrasive tools, chemical removal, and the like.

Although not required, an interlayer 32 may be disposed between the inner surfaces 18a, 20a of the exterior and interior substrates 18, 20, as illustrated in FIGS. 4a-4f. In other words, the window assembly 10 may include the exterior and interior substrates 18, 20 having the transparent layer 24 and the interlayer 32 sandwiched therebetween. The interlayer 32 preferably bonds the exterior and interior substrates 18, 20 and prevents the window assembly 10 from shattering upon impact. Preferably, the interlayer 32 is substantially transparent to light and typically includes a polymer or thermoplastic resin, such as polyvinyl butyral (PVB). However, other suitable materials for implementing the interlayer 32 may be used. Preferably, the interlayer 32 has a thickness of between 0.5 mm to 1 mm.

Figure 4A:
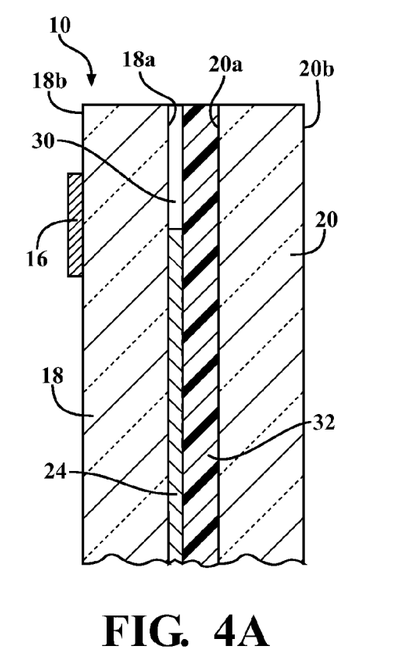
FIG. 4a is a cross-sectional partial view of the window assembly having an interlayer sandwiched between the transparent layer and an inner surface of the interior substrate with the antenna element overlapping the transparent layer and overlapping the outer region while disposed on the outer surface of the exterior substrate.
Figure 4B:
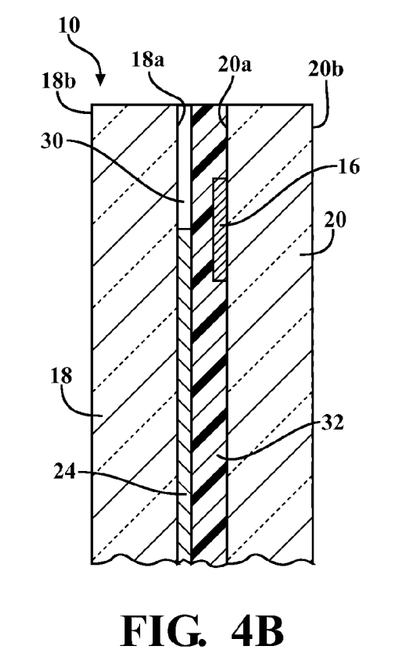
FIG. 4b is a cross-sectional partial view of the window assembly having the interlayer sandwiched between the transparent layer and the inner surface of the interior substrate with the antenna element overlapping the transparent layer and overlapping the outer region while sandwiched between the interlayer and the inner surface of the interior substrate.
Figure 4C:
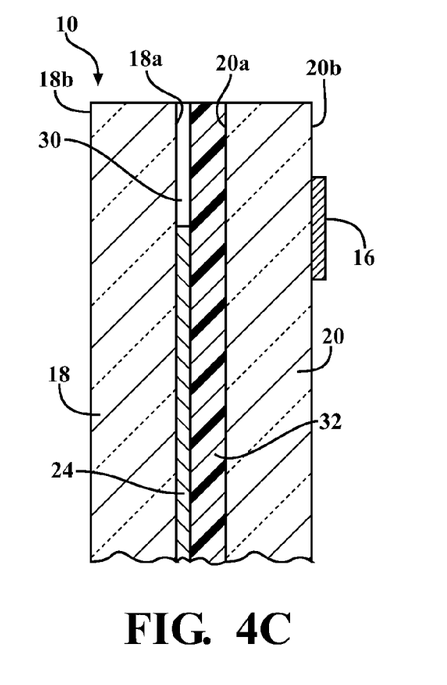
FIG. 4c is a cross-sectional partial view of the window assembly having the interlayer sandwiched between the transparent layer and the inner surface of the interior substrate with the antenna element overlapping the transparent layer and overlapping the outer region while disposed on the outer surface of the interior substrate.
Figure 4D:
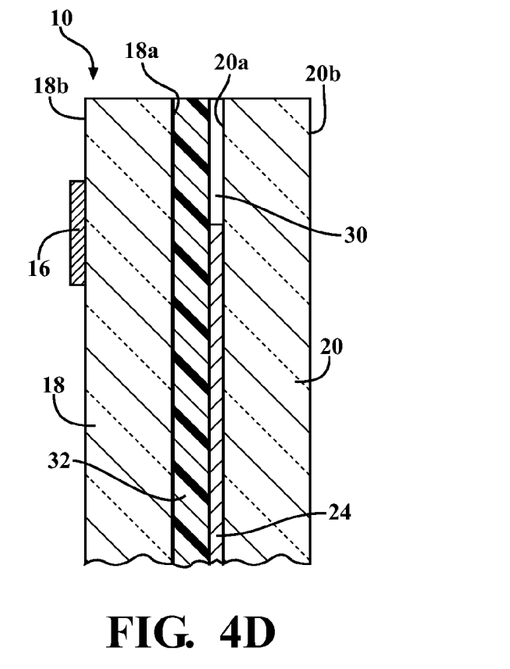
FIG. 4d is a cross-sectional partial view of the window assembly having the interlayer sandwiched between the transparent layer and an inner surface of the exterior substrate with the antenna element overlapping the transparent layer and overlapping the outer region while disposed on the outer surface of the exterior substrate.
Figure 4E:
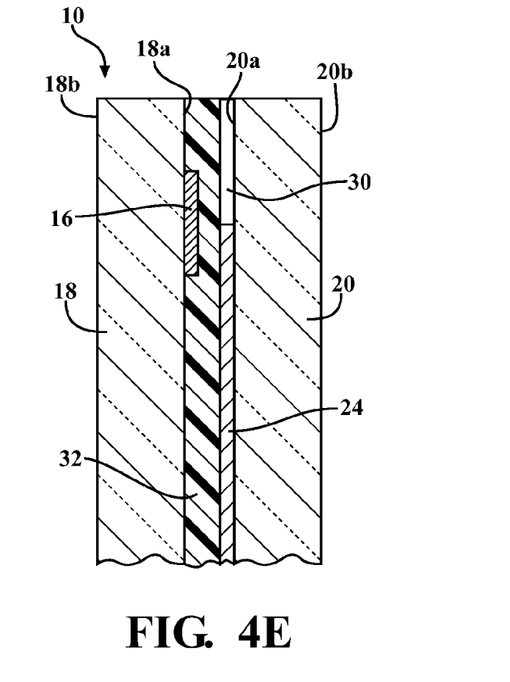
FIG. 4e is a cross-sectional partial view of the window assembly having the interlayer sandwiched between the transparent layer and the inner surface of the exterior substrate with the antenna element overlapping the transparent layer and overlapping the outer region while sandwiched between the interlayer and the inner surface of the exterior substrate.
Figure 4F:
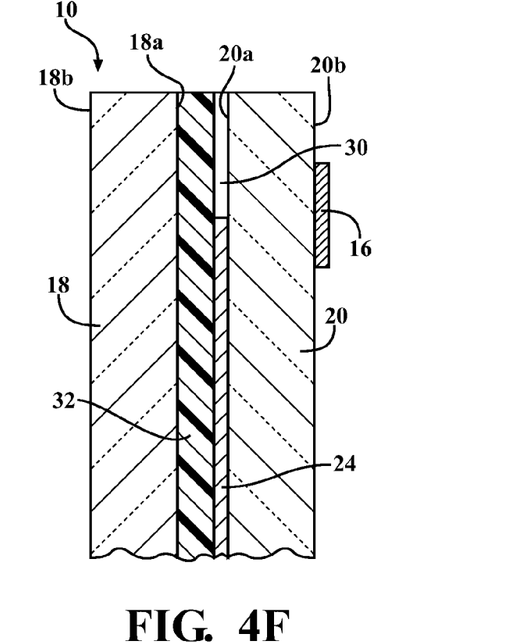
FIG. 4f is a cross-sectional partial view of the window assembly having the interlayer sandwiched between the transparent layer and the inner surface of the exterior substrate with the antenna element overlapping the transparent layer and overlapping the outer region while disposed on the outer surface of the interior substrate.

The transparent layer 24 may be disposed adjacent the interlayer 32. Specifically, the transparent layer 24 may be disposed between the interlayer 32 and the inner surface 18a of the exterior substrate 18, as shown in FIGS. 4a-4c. Alternatively, as shown in FIGS. 4d-4f, the transparent layer 24 may be disposed between the interlayer 32 and the inner surface 20a of the interior substrate 20. Preferably, the window assembly 10 includes the transparent layer 24 and interlayer 32 sandwiched between the exterior and interior substrates 18, 20 such that the interlayer 32 and the transparent layer 24 are abutting the inner surfaces 18a, 20a of the exterior and/or interior substrates 18, 20.

Figure 5A:
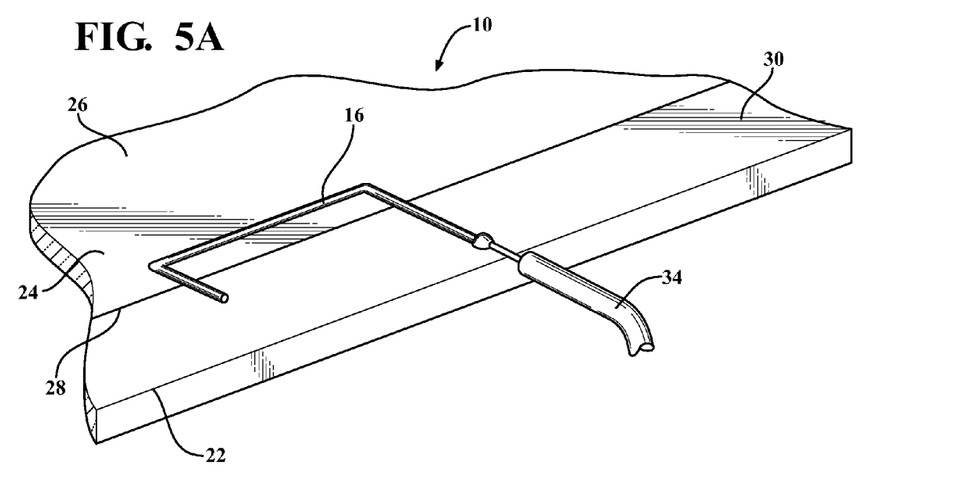
FIG. 5a is an enlarged view of the window assembly having the antenna element including metal wire overlapping the transparent layer and overlapping the outer region with a feeding element coupled to the antenna element including metal wire.

The antenna element 16 may include metal wire, as shown in FIG. 5a. As used herein, the term "wire" refers generally to at least one strand or rod of metal. Typically, the strands or rods are flexible and are formed of copper, or other metals. However, the antenna element 16 may also be formed of an electrically conductive paste, such as a silver paste. The antenna element 16 may be applied to the window assembly 10 according to any suitable method, such as printing, firing, and the like. The antenna element 16 including metal wire may have a predetermined diameter and length correlating to a predetermined wavelength of radio waves intended to be transmitted or received by the antenna element 16. Typically, the antenna element 16 including metal wire is substantially opaque to light such that light cannot pass through the antenna element 16. The antenna element 16 may have any suitable configuration for transmitting and/or receiving RF signals. For instance, the antenna element 16 may have a monopole or dipole configuration of the type shown in FIG. 5a. Furthermore, the antenna element 16 including metal wire may have a loop or meander line configuration. In addition, the antenna element 16 may be included as a subcomponent of a more complex antenna assembly. As mentioned above, the antenna element 16 preferably transmits or receives linearly polarized radio waves. In particular, the antenna element 16 including metal wire is most preferred for transmission or reception of linearly polarized radio waves.

Figure 6A:
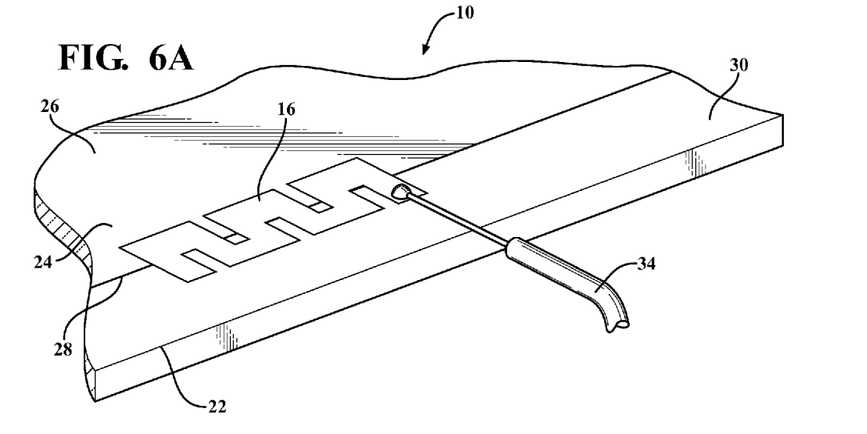
FIG. 6a is an enlarged view of the window assembly having the antenna element including a transparent coating overlapping the transparent layer and overlapping the outer region with the feeding element coupled to the antenna element including the transparent coating.

As shown in FIG. 6a, the antenna element 16 may also include a transparent coating which is electrically conductive. The transparent coating may be of the same type as the transparent layer 24. The transparent coating may also be a transparent film, or the like. The antenna element 16 including transparent coating is also preferred for transmission or reception of linearly polarized radio waves. The antenna element 16 including transparent coating may any suitable configuration, such as a monopole or dipole configuration. In addition, the antenna element 16 may include a combination of metal wire and transparent coating. It is also to be appreciated that the specific configurations of the antenna elements 16 shown throughout the Figures are for illustrative purposes and are not intended to limit the scope of the present invention to the specific embodiments illustrated therein. As such, the antenna element 16 may be of any other suitable configuration not shown throughout the Figures.

The antenna element 16 overlaps the transparent layer 24 and overlaps the outer region 30. In other words, the antenna is disposed on or in the window assembly 10 with one portion of the antenna element 16 overlapping the area 26 of the transparent layer 24 and another portion of the antenna element 16 overlapping the outer region 30. As used herein, the term "overlap" is meant generally to describe a spatial relationship between components of the window assembly 10, e.g., the transparent layer 24 and the antenna element 16, whereby one of the components is disposed behind or in front of the other component as seen through the window assembly 10 from the perspective of a driver or occupant of the vehicle 12. The antenna element 16 may extend from the outer region 30 across the second peripheral boundary 28 and into the area 26 of the transparent layer 24. As such, the one portion of the antenna element 16 overlaps the transparent layer 24, which is electrically conductive. Simultaneously, the other portion of the antenna element 16 remains overlapping the outer region 30, which is electrically non-conductive. It is to be appreciated that any suitable portion of the antenna element 16 may overlap the transparent layer 24 or outer region 30. For instance, the one portion of the antenna element 16 representing 80 percent of the antenna element 16 may be overlapping the outer region 30 while the other portion representing 20 percent of the antenna element 16 may be overlapping the transparent layer 24, or vice-versa.

The antenna element 16 is disposed non-coplanar with respect to the transparent layer 24 such that the antenna element 16 is spaced from and not directly abutting the transparent layer 24. Specifically, the antenna element 16 overlaps the transparent layer 24 yet is on a different layer of the window assembly 10 than the transparent layer 24, as will be described below. Furthermore, the transparent layer 24 and the antenna element 16 may be separated by the interlayer 32 and/or one of the exterior and interior substrates 18, 20. As such, the antenna element 16 and the transparent layer 24 are in a non-contacting state. Accordingly, the antenna element 16 is preferably electrically disconnected from the transparent layer 24. In other words, the antenna element 16 is neither wired nor soldered directly to the transparent layer 24. However, the antenna element 16 is generally capacitively coupled to the transparent layer 24, as will be described below. Furthermore, the antenna element 16 may be disposed on more than one layer of the window assembly 10. Specifically, the antenna element 16 may extend into other layers, such as the interlayer 32. Also, the antenna element 16 may extend through one of the exterior and interior substrates 18, 20 simultaneously while overlapping the outer region 30 and the transparent layer 24.

The outer region 30 may have any suitable dimensions, configuration, or shape for accommodating the antenna element 16. For instance, the outer region 30 may have a rectangular configuration, a curved configuration, or the like. More specifically, the first and second peripheral boundaries 22, 28 defining the outer region 30 may follow a substantially linear path, curved path, or the like. The outer region 30 may be sized such that the antenna element 16 substantially occupies the outer region 30. In other words, the outer region 30 may be sized to the extent necessary to effectively accommodate the antenna element 16. As such, the area 26 of the transparent layer 24 is maximized for its other functions, such as a radiating element or an element for absorbing infrared radiation penetrating the window assembly 10. Alternatively, the antenna element 16 may occupy only a minority of the outer region 30.

While overlapping the transparent layer 24 and the outer region 30, the antenna element 16 may be arranged according to several configurations with respect to the transparent layer 24, interlayer 32, and substrates 18, 20 of the window assembly 10. In instances where the window assembly 10 is absent the interlayer 32, FIG. 2a shows the antenna element 16 overlapping the transparent layer 24 and the outer region 30 while disposed on the outer surface 18b of the exterior substrate 18 of the window assembly 10. In another embodiment, as shown in FIG. 2b, the antenna element 16 overlaps the transparent layer 24 and the outer region 30 while disposed on the outer surface 20b of the interior substrate 20 of the window assembly 10. In FIGS. 2a and 2b, the antenna element 16 is non-coplanar with respect to the transparent layer 24 such that the antenna element 16 is not directly abutting the transparent layer 24.

Where the window assembly 10 has the interlayer 32 disposed between the transparent layer 24 and the inner surface 20a of the interior substrate 20, FIG. 4a, shows the antenna element 16 overlapping the transparent layer 24 and the outer region 30 while disposed on the outer surface 18b of the exterior substrate 18, according to one embodiment. Alternatively, as shown in FIG. 4c, the antenna element 16 overlaps the transparent layer 24 and the outer region 30 while disposed on the outer surface 20b of the interior substrate 20. In another embodiment as shown in FIG. 4b, the antenna element 16 overlaps the transparent layer 24 and the outer region 30 while disposed between the interlayer 32 and the inner surface 20a of the interior substrate 20.

Where the window assembly 10 has the interlayer 32 disposed between the transparent layer 24 and the inner surface 18a of the exterior substrate 18, FIG. 4d shows the antenna element 16 overlapping the transparent layer 24 and the outer region 30 while disposed on the outer surface 18b of the exterior substrate 18, according to another embodiment. Alternatively, as shown in FIG. 4f, the antenna element 16 overlaps the transparent layer 24 and the outer region 30 while disposed on the outer surface 20b of the interior substrate 20.

In a preferred embodiment as shown in FIG. 4e, the antenna element 16 overlaps the transparent layer 24 and the outer region 30 while disposed between the interlayer 32 and the inner surface 18a of the exterior substrate 18. In instances where the antenna element 16 is disposed between the interlayer 32 and the inner surface 18a, 20a of one of the exterior and interior substrates 18, 20, such as shown in the embodiments of FIGS. 4b and 4e, it is to be appreciated that the antenna element 16 may be embedded within the interlayer 32 or embedded within the exterior or interior substrate 18, 20. As mentioned above, the antenna element 16 is disposed non-coplanar with respect to the transparent layer 24 throughout the Figures. Although not specifically illustrated throughout the Figures, it is also to be appreciated that the antenna element 16 and/or the transparent layer 24 may be embedded within the interlayer 32 such that the antenna element 16 and/or the transparent layer 24 are disposed non-coplanar with respect to one another.

Figure 7:
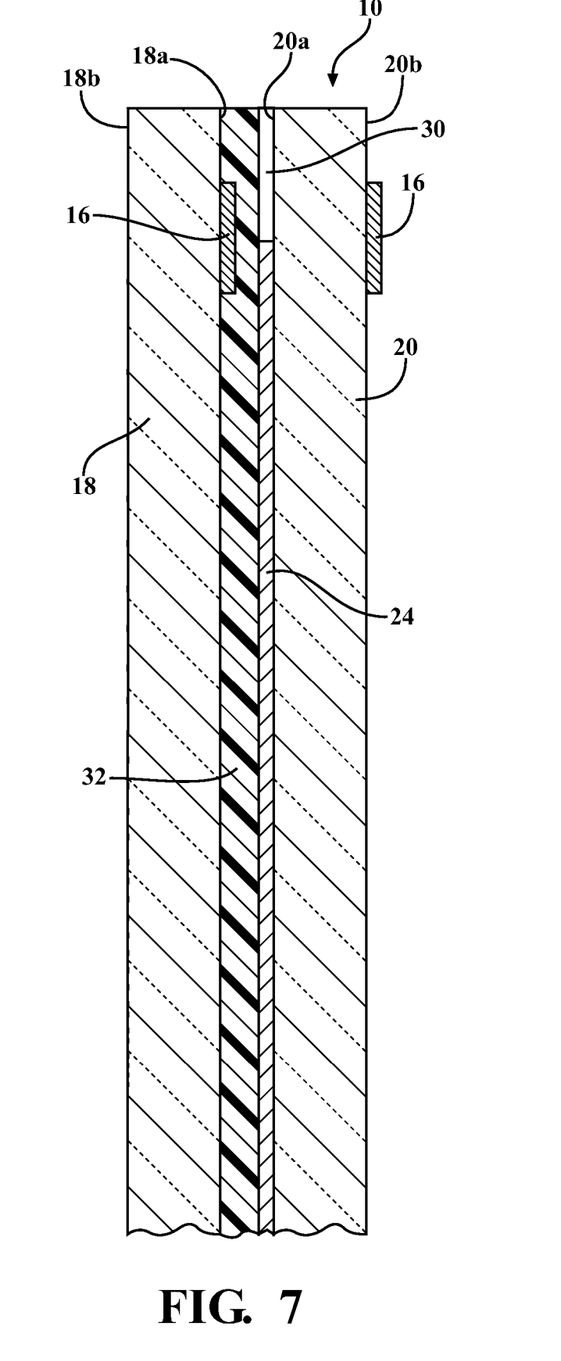
FIG. 7 is a cross-sectional partial view of the window assembly having a first antenna element overlapping the transparent layer and overlapping the outer region while sandwiched between the interlayer and the inner surface of the exterior substrate and a second antenna element disposed on the outer surface of the interior substrate.

Still, according to another embodiment as shown in FIG. 7, the window assembly 10 includes a second antenna element 16 wherein one of the antenna elements 16 is disposed on the outer surface 20b of the interior substrate 20 and the other of the antenna elements 16 is disposed on the inner surface 18a of the exterior substrate 18. At least one of the antenna elements 16 preferably overlaps the transparent layer 24 and the outer region 30. However, both antenna elements 16 may be overlapping the transparent layer 24 and the outer region 30 on different layers of the window assembly 10. In addition, both antenna elements 16 may be overlapping each other on different layers of the window assembly 10. In the embodiment of FIG. 7, the transparent layer 24 is disposed between the first and second antenna elements 16. It is to be appreciated that the first and second antenna elements 16 may implement a diversity antenna system whereby the first and second antenna elements 16 may be configured to transmit or receive signals in multiple directions within a field of reception. Specifically, the received signal may be switched or combined between the first and second antenna elements 16 to minimize interference and temporary fading of the signal. It is to be appreciated that the antenna elements 16 may be disposed according to numerous embodiments with respect to the substrates 18, 20, the transparent layer 24, and the interlayer 32, not specifically shown in the Figures.

As shown generally in FIGS. 5 and 6, the window assembly 10 includes a feeding element 34 coupled to the antenna element 16 for energizing the antenna element 16. With respect to the feeding element 34, the term "energize" is understood to describe an electrical relationship between the feeding element 34 and the antenna element 16 whereby the feeding element 34 excites the antenna element 16 for transmission of radio waves, and is electrically coupled to the antenna element 16 for reception of impinging radio waves by the antenna element 16. The feeding element 34 may include any suitable material for energizing the antenna element 16. For instance, the feeding element 34 may include a feeding strip, a feeding wire, or a combination of both. Also, the feeding element 34 may be a balanced or unbalanced line. For example, the feeding element 34 may be an unbalanced coaxial cable, microstrip, or single wire line. Furthermore, the feeding element 34 may include any suitable feeding network for providing phase shifting to the RF signal transmitted or received by the antenna element 16. In addition, the feeding element 34 may include a transparent coating of the same type as the transparent layer 24 and/or the antenna element 16. Additionally, a plurality of feeding elements 34 may be coupled to one or more antenna elements 16 for energizing the antenna elements 16. Preferably, the feeding element 34 is disposed adjacent and in parallel relationship to the antenna element 16 and the transparent layer 24. More specifically, the feeding element 34 is generally disposed on the inner surfaces 18a, 20a or outer surfaces 18b, 20b of one of the exterior and interior substrates 18, 20 of the window assembly 10. However, it is to be appreciated that the feeding element 34 may be disposed on any layer of the window assembly 10. Furthermore, the feeding element 34 may be disposed coplanar or non-coplanar with respect to the antenna element 16.

According to one embodiment, as shown in FIGS. 5d, 5e, 6d, and 6e, the feeding element 34 is abutting and in direct electrical connection with the antenna element 16 for energizing the antenna element 16. In other words, the feeding element 34 may be directly wired or soldered to the antenna element 16. The feeding element 34 passes electrical current to the antenna element 16 directly through an electrically conductive material, such as a feeding strip or wire, physically attached to the antenna element 16. It is to be appreciated that the feeding element 34 and the antenna element 16 may be abutting and in direct electrical connection on the window assembly 10 according to several other configurations with respect to the transparent layer 24 and the interlayer 32 not specifically illustrated throughout the Figures.

Alternatively, as shown in FIGS. 5b, 5c, 6b, and 6c, the feeding element 34 may be spaced from and capacitively coupled to the antenna element 16 for energizing the antenna element 16. In particular, the feeding element 34 induces electrical current to the antenna element 16 through the air or a dielectric material, such as the exterior or interior substrates 18, 20 and/or interlayer 32. In such embodiments, the feeding element 34 is neither hard-wired nor in direct contact with the antenna element 16 and is generally disposed non-coplanar with the antenna element 16. It is to be appreciated that the feeding element 34 may be spaced from and capacitively coupled to the antenna element 16 on the window assembly 10 according to several other embodiments with respect to the transparent layer 24 and the interlayer 32 which are not specifically illustrated throughout the Figures.

In one embodiment, the feeding element 34 overlaps the outer region 30. Specifically, the feeding element 34 may be disposed entirely within the outer region 30 for energizing the antenna element 16. Alternatively, part of the feeding element 34 may be overlapping the outer region 30. In such instances, the feeding element 34 may overlap the transparent layer 24. Furthermore, the feeding element 34 may be coupled to the antenna element 16 without overlapping the outer region 30. For example, the antenna element 16 may extend beyond the first peripheral boundary 22 and the feeding element 34 may couple the antenna element 16 beyond the first peripheral boundary 22 and outside the outer region 30. Having the antenna element 16 partially disposed in the outer region 30 allows for simple feeding arrangements as the feeding element 34 typically originates from beyond the first peripheral boundary 22. As such, in the outer region 30, the feeding element 34 generally does not obstruct the field of view of the driver or occupant of the vehicle 12.

The antenna element 16 may be coupled to the transparent layer 24. More specifically, the antenna element 16 may be capacitively coupled to the transparent layer 24. As mentioned above, the antenna element 16 overlaps the transparent layer 24. As the antenna element 16 is energized by the feeding element 34, the antenna element 16 capacitively transfers energy to the transparent layer 24. Capacitive coupling between the antenna element 16 and the transparent layer 24 may occur through any combination of the substrates 18, 20 and/or the interlayer 32 of the window assembly 10.

The antenna element 16 overlaps and couples to the transparent layer 24 such that the transparent layer 24 is utilized to the advantage of the antenna element 16. Specifically, overlapping between the antenna element 16 and the transparent layer 24 allows flexibility to modify impedance characteristics of the antenna element 16. As such, impedance matching of the antenna element 16 improves efficiency of the antenna element 16. Additionally, overlapping between the antenna element 16 and the transparent layer 24 allows potential miniaturization of the antenna element 16.

The transparent layer 24 may operate as an active antenna element with respect to the antenna element 16. That is, while the transparent layer 24 is electrically coupled to the antenna element 16, RF current may be channeled through the transparent layer 24 such that the transparent layer 24 actively excites RF waves. Furthermore, the antenna element 16 and the transparent layer 24 may both be driven by feeding elements 34 such that the antenna element 16 and the transparent layer 24 collaboratively excite RF signals.

Alternatively, the transparent layer 24 may operate as a parasitic element with respect to the antenna element 16. In such instances, the transparent layer 24 does not actively excite RF waves. Instead, the antenna element 16 is solely energized generally independent of the transparent layer 24. The transparent layer 24 couples to the antenna element 16 to modify a radiation pattern of the antenna element 16. As such, the transparent layer 24 may direct RF waves transmitted or received by the antenna element 16 in a predetermined direction thereby improving performance of the antenna element 16. It is to be appreciated that improvement of performance of the antenna element 16 may vary depend upon the location of the antenna element 16 with respect to the transparent layer 24, the shape of the antenna element 16, and the extent to which the antenna element 16 overlaps the transparent layer 24.

Accordingly, the outer region 30 enables uninterrupted transmission and/or reception of RF waves by the antenna element 16 as the antenna element 16 is energized on the window assembly 10. Furthermore, the area 26 of the transparent layer 24 is maximized and the transparent layer 24 may still function for other purposes, such as a defrosting or a defogging element, an infrared radiation absorbing material, and the like. Additionally, disposal of the antenna element 16 in the outer region 30 provides an unobstructed field of view for the driver of the vehicle 12. Furthermore, the antenna element 16 may be included with the window assembly 10 in instances where there would otherwise be minimal or no space available on the window assembly 10 for the antenna element 16 to function properly.

Figure 5B:
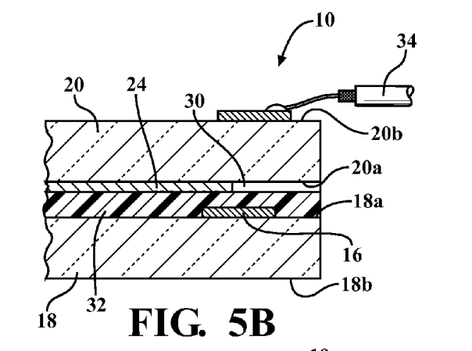
FIG. 5b is a partial cross-sectional view of the window assembly having the feeding element spaced from and capacitively coupled to the antenna element including metal wire and the transparent layer.
Figure 5C:
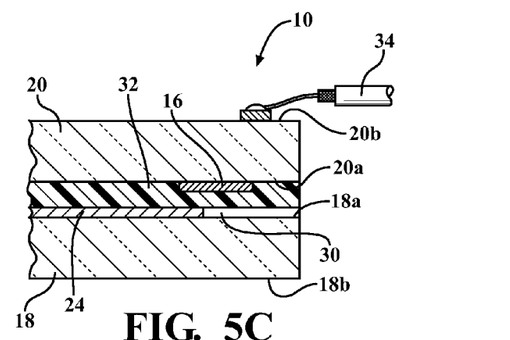
FIG. 5c is a partial cross-sectional view of the window assembly having the feeding element spaced from and capacitively coupled to the antenna element including metal wire.
Figure 5D:
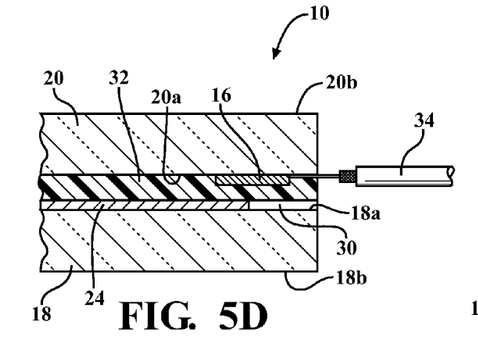
FIG. 5d is a partial cross-sectional view of the window assembly having the feeding element abutting and in direct electrical connection with the antenna element including metal wire.
Figure 6B:
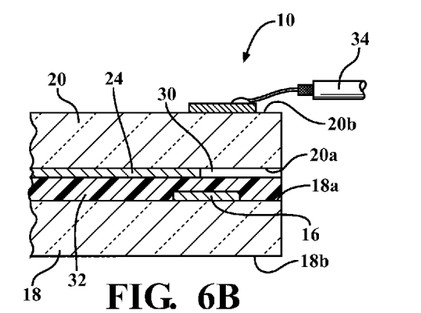
FIG. 6b is a partial cross-sectional view of the window assembly having the feeding element spaced from and capacitively coupled to the antenna element including the transparent coating and the transparent layer.
Figure 6C:
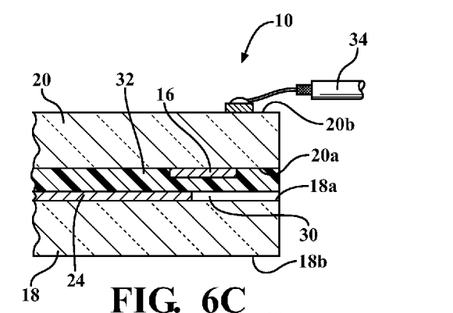
FIG. 6c is a partial cross-sectional view of the window assembly having the feeding element spaced from and capacitively coupled to the antenna element including the transparent coating.
Figure 6D:
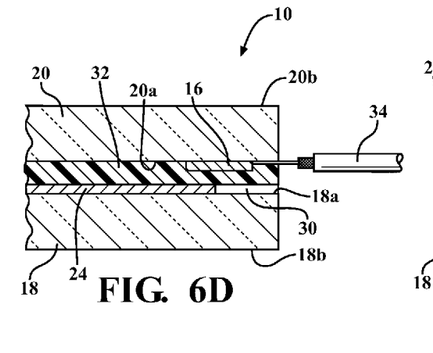
FIG. 6d is a partial cross-sectional view of the window assembly having the feeding element abutting and in direct electrical connection with the antenna element including the transparent coating.

The feeding element 34 may be electrically decoupled from the transparent layer 24. Specifically, the feeding element 34 may be capacitively decoupled from the transparent layer 24. In particular, FIG. 5c shows the feeding element 34 capacitively coupled to the antenna element 16 including metal wire yet capacitively decoupled from the transparent layer 24. Similarly, FIG. 6c, shows the feeding element 34 capacitively coupled to the antenna element 16 including transparent coating but capacitively decoupled from the transparent layer 24. Furthermore, the feeding element 34 may be electrically disconnected from the transparent layer 24, and therefore, electrically decoupled from the transparent layer 24. In other words, the feeding element 34 is not in direct electrical contact with the transparent layer 24. In particular, FIG. 5d shows the feeding element 34 electrically connected to the antenna element 16, which includes metal wire, yet electrically disconnected from the transparent layer 24. Similarly, FIG. 6d, shows the feeding element 34 electrically connected to the antenna element 16 including transparent coating but electrically disconnected from the transparent layer 24.

Where the feeding element 34 is electrically decoupled from the transparent layer 24, the transparent layer 24 may operate as a parasitic element with respect to said antenna element 16. Specifically, it is preferred that the feeding element 34 is electrically coupled to the antenna element 16 solely and independent of the transparent layer 24. As such, the feeding element 34 may energize the antenna element 16 independent of the transparent layer 24. The transparent layer 24 may parasitically couple to the antenna element 16 to modify the radiation pattern of the antenna element 16.

Figure 5E:
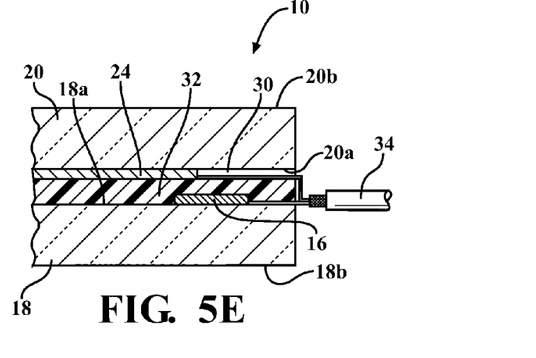
FIG. 5e is a partial cross-sectional view of the window assembly having the feeding element abutting and in direct electrical connection with the antenna element including metal wire and the transparent layer.
Figure 6E:
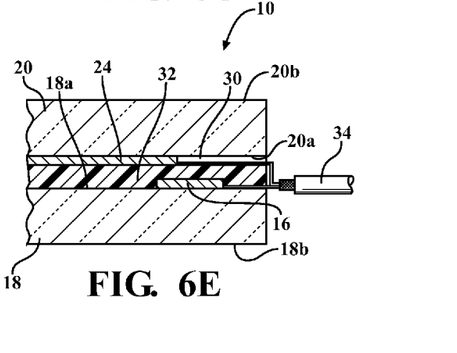
FIG. 6e is a partial cross-sectional view of the window assembly having the feeding element abutting and in direct electrical connection with the antenna element including the transparent coating and the transparent layer.

Alternatively, the feeding element 34 may be electrically coupled to the transparent layer 24. Specifically, the feeding element 34 may be spaced from and capacitively coupled to the transparent layer 24. In particular, FIG. 5b shows the feeding element 34 overlapping and capacitively coupled to both the antenna element 16 including metal wire and the transparent layer 24. Similarly, FIG. 6b, shows the feeding element 34 overlapping and capacitively coupled to both the antenna element 16 including transparent coating and the transparent layer 24. Furthermore, the feeding element 34 may be abutting and in direct electrical contact to the transparent layer 24, and therefore, electrically coupled to the transparent layer 24. In particular, FIG. 5e shows the feeding element 34 electrically connected to both the antenna element 16 including metal wire and the transparent layer 24. Similarly, FIG. 6e, shows the feeding element 34 electrically connected to both the antenna element 16 including transparent coating and the transparent layer 24.

Where the feeding element 34 is electrically coupled to the transparent layer 24, the transparent layer 24 may operate as an active antenna element with respect to the antenna element 16. As such, the feeding element 34 may energize the transparent layer 24 as the active antenna element. That is, the feeding element 34 may energize both the antenna element 16 and the transparent layer 24 for excitation of RF waves. It is to be appreciated that the feeding element 34 may also be electrically connected to the transparent layer 24 for other purposes. For instance, the feeding element 34 may electrically connect to the transparent layer 24 for an electrical ground reference, or the like. Furthermore, it is to be appreciated that mere electrical connection of the feeding element 34 to both the antenna element 16 and the transparent layer 24 does not generally establish direct contact between the antenna element 16 and the transparent layer 24.

However, in instances where the transparent layer 24 operates as an active antenna element, the feeding element 34 may still be electrically disconnected from the transparent layer 24. Specifically, a second feeding element 34 may solely energize the transparent layer 24 independent of the antenna element 16. In other words, the feeding element 34 may energize the antenna element 16 while the second feeding element 34 simultaneously energizes the transparent layer 24. Similarly, in instances where the transparent layer 24 operates as the parasitic element, the feeding element 34 may be electrically connected to the transparent layer 24. Specifically, as mentioned above, the feeding element 34 may electrically connect to the transparent layer 24 for an electrical ground reference, or the like The feeding element 34 may be abutting and in direct electrical connection with transparent layer 24, as shown in the embodiments of FIGS. 5e and 6e. Alternatively, the feeding element 34 may be spaced from and capacitively coupled to the transparent layer 24, as shown in the embodiments of FIGS. 5b and 6b. It is to be appreciated that the feeding element 34 may be electrically connected to other components such as the vehicle 12 body, and the like.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A window assembly for a vehicle, said window assembly comprising:
an exterior substrate having an inner surface and an outer surface;
an interior substrate disposed adjacent said exterior substrate and having an inner surface and an outer surface with said exterior and interior substrates defining a first peripheral boundary;
a transparent layer disposed between said inner surfaces of said exterior and interior substrates and defining an area covering said window assembly with said area defining a second peripheral boundary, wherein said transparent layer comprises a metal compound such that said transparent layer is electrically conductive;
an outer region defined on said window assembly between said first and second peripheral boundaries and being electrically non-conductive;
an antenna element overlapping said transparent layer and overlapping said outer region and being disposed non-coplanar with respect to said transparent layer and being spaced from and not directly abutting said transparent layer; and
a feeding element being configured to actively energize said antenna element and wherein said feeding element is disposed non-coplanar with respect to said antenna element and is spaced from and not directly abutting said antenna element; and wherein said feeding element is spaced from and not directly abutting said transparent layer and wherein said transparent layer provides no electrical return path to said feeding element.

2. A window assembly as set forth in claim 1 wherein said antenna element comprises metal wire.

3. A window assembly as set forth in claim 1 wherein said antenna element comprises a transparent coating which is electrically conductive.

4. A window assembly as set forth in claim 1 wherein said feeding element overlaps said transparent layer and overlaps said outer region.

5. A window assembly as set forth in claim 1 including an interlayer disposed between said inner surfaces of said exterior and interior substrates.

6. A window assembly as set forth in claim 5 wherein said transparent layer is disposed between said interlayer and said inner surface of said exterior substrate.

7. A window assembly as set in claim 5 wherein said transparent layer is disposed between said interlayer and said inner surface of said interior substrate.

8. A window assembly as set forth in claim 5 wherein said antenna element is disposed between said interlayer and said inner surface of said exterior substrate.

9. A window assembly as set forth in claim 5 wherein said antenna element is disposed between said interlayer and said inner surface of said interior substrate.

10. A window assembly as set forth in claim 1 wherein said metal compound comprises a metal oxide.

11. A window assembly as set forth in claim 10 wherein said metal oxide comprises a tin oxide.

12. A window assembly as set forth in claim 1 wherein said antenna element is disposed on said outer surface of one of said exterior and interior substrates.

13. A window assembly as set forth in claim 1 including a second antenna element wherein one of said antenna elements is disposed on said outer surface of said interior substrate and the other of said antenna elements is disposed on said inner surface of said exterior substrate.

14. A window assembly as set forth in claim 1 wherein said exterior and interior substrates are defined as soda-lime-silica glass which is substantially transparent to light and electrically non-conductive.

15. A window assembly as set forth in claim 1 wherein said antenna element is configured to transmit or receive linearly polarized radio frequency (RF) signals.

16. A window assembly as set forth in claim 1 wherein said antenna element is configured to transmit or receive circularly polarized radio frequency (RF) signals.

17. A window assembly as set forth in claim 1 wherein said feeding element is disposed within and surrounded by said outer region.

18. A window assembly as set forth in claim 1 wherein said feeding element is galvanically disconnected from said transparent layer.

19. A window assembly as set forth in claim 1 wherein said feeding element does not actively energize said transparent layer such that said transparent layer is configured to passively modify a radiation pattern of said antenna element.

20. A window assembly as set forth in claim 1 wherein said outer region completely surrounds said second peripheral boundary of said area of said transparent layer to avoid electrical path between said transparent layer and a conductive window frame of the vehicle.

21. A window assembly as set forth in claim 5 wherein:
said transparent layer is disposed between said interlayer and said inner surface of one of said interior and exterior substrates;
said antenna element is disposed between said interlayer and said inner surface of the other one of said interior and exterior substrates; and
said feeding element is disposed on said outer surface of said interior substrate.

* * * * *